(12) United States Patent
Song et al.

(10) Patent No.: US 10,984,260 B2
(45) Date of Patent: Apr. 20, 2021

(54) METHOD AND APPARATUS FOR CONTROLLING A VEHICLE INCLUDING AN AUTONOMOUS CONTROL SYSTEM

(71) Applicant: GM GLOBAL TECHNOLOGY OPERATIONS LLC, Detroit, MI (US)

(72) Inventors: Xiaofeng F. Song, Novi, MI (US); Nikhil L. Hoskeri, Ann Arbor, MI (US); Quan Zhang, Toronto (CA)

(73) Assignee: GM Global Technology Operations LLC, Detroit, MI (US)

(*) Notice: Subject to any disclaimer, the term of this patent is extended or adjusted under 35 U.S.C. 154(b) by 77 days.

(21) Appl. No.: 16/420,657

(22) Filed: May 23, 2019

(65) Prior Publication Data
US 2020/0372263 A1 Nov. 26, 2020

(51) Int. Cl.
| | |
|---|---|
| *G06K 9/00* | (2006.01) |
| *G06T 7/73* | (2017.01) |
| *B60R 11/04* | (2006.01) |
| *G01C 21/30* | (2006.01) |
| *G05D 1/02* | (2020.01) |

(52) U.S. Cl.
CPC .......... *G06K 9/00798* (2013.01); *B60R 11/04* (2013.01); *G01C 21/30* (2013.01); *G05D 1/0251* (2013.01); *G06T 7/73* (2017.01); *B60R 2300/105* (2013.01); *G06T 2207/30252* (2013.01)

(58) Field of Classification Search
CPC .... G06K 9/00798; G05D 1/0251; G06T 7/73; G06T 2207/30252; G01C 21/30; B60R 11/04; B60R 2300/105
See application file for complete search history.

(56) References Cited

U.S. PATENT DOCUMENTS

| | | | | |
|---|---|---|---|---|
| 2016/0364921 | A1* | 12/2016 | Iyoda | G07C 5/0841 |
| 2017/0045362 | A1* | 2/2017 | Song | G01C 21/30 |
| 2017/0320493 | A1* | 11/2017 | Stephens | B60W 30/12 |
| 2019/0103023 | A1* | 4/2019 | McNew | G01S 13/931 |
| 2020/0064138 | A1* | 2/2020 | Takahama | G01C 21/28 |

\* cited by examiner

*Primary Examiner* — Qian Yang
(74) *Attorney, Agent, or Firm* — Quinn IP Law

(57) ABSTRACT

Operation of a vehicle that includes an autonomous operating system including an on-board map database includes operating in a travel lane employing a lane keeping control system and an adaptive cruise control system and monitoring a plurality of lane reference markers. Periodically, parameters are determined, including a first lateral offset for the vehicle based upon a forward-monitoring sensor and one of the lane reference markers, and a second lateral offset for the vehicle based upon a GPS sensor and the map database. A difference and an associated variance are determined, and an error in the map database is determined when the variance is greater than a threshold variance. The vehicle operator is alerted to actively control the vehicle based upon the detected error in the map database.

17 Claims, 3 Drawing Sheets

METHOD AND APPARATUS FOR CONTROLLING A VEHICLE INCLUDING AN AUTONOMOUS CONTROL SYSTEM

INTRODUCTION

A vehicle employing an autonomous control system may employ an on-board map database for purposes of operational control of the vehicle when operating in an autonomous state. An on-board map database may differ from a road ground truth due to a variety of factors, including, e.g., construction events. Autonomous control of a vehicle may cause a vehicle to traverse an undesired travel path when the on-board map database differs from the road ground truth. There is a need to detect a difference between the road ground truth and an on-board map database in order to prevent a vehicle from taking an unexpected excursion onto an undesired travel path. There is a need to provide an improved system for notifying a vehicle operator of a need to control the vehicle due to lack of correlation between an onboard map database and road ground truth.

SUMMARY

A vehicle is described and includes a global positioning system (GPS) sensor, and an autonomous operating system including an on-board map database, a forward-monitoring sensor, an adaptive cruise control system, and a lane keeping control system. A method for operating the vehicle includes operating the vehicle in a travel lane employing the lane keeping control system and the adaptive cruise control system and monitoring, via the forward-monitoring sensor, a plurality of lane reference markers associated with the travel lane. Periodically, parameters are determined, including a first lateral offset for the vehicle based upon the forward-monitoring sensor and one of the lane reference markers, and a second lateral offset for the vehicle based upon the GPS sensor and the map database. A difference between the second lateral offset and the first lateral offset is determined. A variance in the periodically determined differences between the second lateral offset and the first lateral offset is determined, and an error in the map database is determined when the variance is greater than a threshold variance. The vehicle operator is alerted to actively control the vehicle based upon the detected error in the map database.

An aspect of the disclosure includes determining a lateral offset differential based upon the periodically determined first lateral offsets, detecting occurrence of a lane change maneuver based upon the lateral offset differential, and compensating the difference between the second lateral offset and the first lateral offset based upon the occurrence of the lane change.

Another aspect of the disclosure includes determining the second lateral offset for the vehicle coincident in time and in space with determining the first lateral offset for the vehicle.

Another aspect of the disclosure includes capturing, in a buffer of the controller, each of the periodically determined differences between the second lateral offset and the first lateral offset, and determining the variance of the periodically determined differences between the second lateral offset and the first lateral offset that are captured in the buffer of the controller.

Another aspect of the disclosure includes the buffer of the controller being a first-in, first-out (FIFO) buffer.

Another aspect of the disclosure includes monitoring a plurality of enable criteria associated with each of the periodically determined differences between the second lateral offset and the first lateral offset, and excluding the periodically determined difference between the second lateral offset and the first lateral offset when any one of the plurality of enable criteria associated with the respective difference between the second lateral offset and the first lateral offset are not satisfied.

Another aspect of the disclosure includes monitoring a plurality of enable criteria associated with each of the periodically determined differences between the second lateral offset and the first lateral offset, and capturing, in the buffer of the controller, the periodically determined difference between the second lateral offset and the first lateral offset only when the plurality of enable criteria associated with the respective difference between the second lateral offset and the first lateral offset are satisfied.

Another aspect of the disclosure includes determining a confidence level associated with monitoring capability of the forward-monitoring sensor.

Another aspect of the disclosure includes assessing whether the lateral offset of the vehicle in relation to the lane marker has been stable for a period of time immediately preceding the present time.

Another aspect of the disclosure includes determining a confidence level associated with accuracy of data from the GPS sensor.

Another aspect of the disclosure includes determining a two-dimensional (2D) position error associated with the signal from the GPS sensor.

Another aspect of the disclosure includes determining whether the signal from the GPS sensor matches information from the navigation system.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Figure 1:
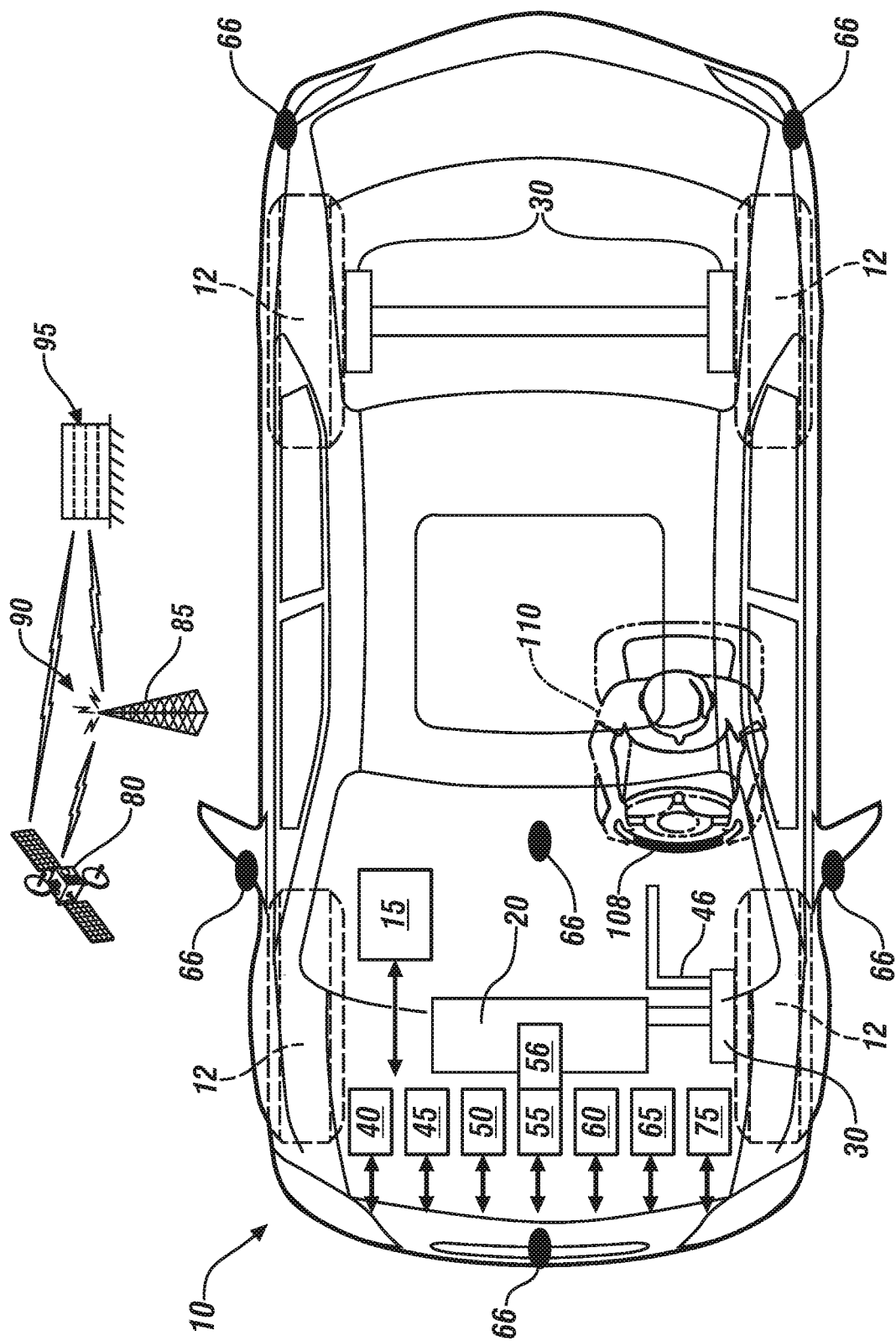
FIG. 1 schematically shows a top view of a vehicle including a configuration for autonomous propulsion control, in accordance with the disclosure.

Referring now to the drawings, wherein the showings are for the purpose of illustrating certain exemplary embodiments, and not for the purpose of limiting the same, FIG. 1 schematically shows an embodiment of a vehicle 10 that is configured with an autonomous operating system 45 that is disposed to provide a level of autonomous vehicle operation. As described herein, the autonomous operating system 45 includes a map database 56, a spatial monitoring system 65 that includes one or a plurality of object-locating sensors 66 that are disposed to effect forward-monitoring, a global positioning system (GPS) sensor 50, an adaptive cruise control (ACC) system 40, and a lane keeping control system. In one embodiment, the map database 56 is disposed in a memory device in a controller on-board of the vehicle 10. In one embodiment, the map database 56 is accessible by an on-board navigation system 55. In one embodiment, the map database 56 is separate and distinct from the map employed by the on-board navigation system 55. Alternatively, the map database 56 is disposed in a memory device in an off-vehicle controller and is accessible by the autonomous operating system 45 via a telematics device 60.

In one embodiment and as described herein, the vehicle 10 includes a propulsion system 20, a wheel braking system 30, the telematics device 60, a human-machine interface (HMI) system 75, and controller 15. The propulsion system 20 includes a prime mover, such as an internal combustion engine, an electric machine, a combination thereof, or another device. In one embodiment, the prime mover is coupled to a fixed gear or continuously variable transmission that is capable of transferring torque and reducing speed. The propulsion system 20 also includes a driveline, such as a differential, transaxle or another gear reduction mechanism. Operation of elements of the propulsion system 20 may be controlled by one or a plurality of controllers, which monitors signals from one or more sensors and generates commands to one or more actuators to control operation in a manner that is responsive to an operator request for vehicle acceleration and propulsion.

The wheel braking system 30 includes a device capable of applying braking torque to one or more vehicle wheels 12, and an associated controller, which monitors signals from one or more sensors and generates commands to one or more actuators to control operation in a manner that is responsive to an operator request for braking.

The ACC system 40 includes a controller that is in communication with the controllers of the wheel braking system 30, the propulsion system 20, and the HMI system 75, and also in communication with the spatial monitoring system 65. The ACC system 40 executes control routines that determine an operator request to maintain vehicle speed at a predefined speed level from the HMI system 75, monitors inputs from the spatial monitoring system 65, and commands operation of the propulsion system 20 and the wheel braking system 30 in response.

The controller 15, and related terms such as control module, module, control, control unit, processor and similar terms refer to various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component(s) is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. There may be a single controller, or a plurality of controllers. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The vehicle 10 includes a telematics device 60, which includes a wireless telematics communication system capable of extra-vehicle communications, including communicating with a communication network system having wireless and wired communication capabilities. The telematics device 60 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively or in addition, the telematics device 60 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics device 60, and the handheld device executes the extra-vehicle communication, including communicating with an off-board controller 95 via a communication network 90 including a satellite 80, an antenna 85, and/or another communication mode. Alternatively or in addition, the telematics device 60 executes the extra-vehicle communication directly by communicating with the off-board controller 95 via the communication network 90.

The vehicle spatial monitoring system 65 includes a spatial monitoring controller in communication with a plurality of object-locating sensors 66. The vehicle spatial monitoring system 65 dynamically monitors an area proximate to the vehicle 10 and generates digital representations of observed or otherwise discerned remote objects. The spatial monitoring system 65 can determine a linear range, relative speed, and trajectory of each proximate remote object based upon information from one or a plurality of the object-locating sensors 66 employing sensor data fusion. The object-locating sensors 66 may include, by way of non-limiting descriptions, front corner sensors, rear corner sensors, rear side sensors, side sensors, a front radar sensor, and a camera in one embodiment, although the disclosure is not so limited. Placement of the object-locating sensors 66 permits the spatial monitoring system 65 to monitor traffic flow including proximate vehicles and other objects around the vehicle 10. Data generated by the spatial monitoring system 65 may be employed by a lane mark detection processor (not shown) to estimate the roadway. The object-locating sensors 66 may include range sensors, such as FM-CW (Frequency Modulated Continuous Wave) radars, pulse and FSK (Frequency Shift Keying) radars, and LIDAR (Light Detection and Ranging) devices, and ultrasonic devices which rely upon effects such as Doppler-effect measurements to locate forward objects. The object-locating sensors 66 may also include charged-coupled devices (CCD) or complementary metal oxide semi-conductor (CMOS) video image sensors, and other camera/video image processors which utilize digital photographic methods to 'view' forward and/or rear objects including one or more object vehicle(s). Such sensing systems are employed for detecting and locating objects in automotive applications and are useable with autonomous operating systems including, e.g., adaptive cruise control, autonomous braking, autonomous steering and side-object detection.

The object-locating sensors 66 associated with the spatial monitoring system 65 are preferably positioned within the vehicle 10 in relatively unobstructed positions. Each of these sensors provides an estimate of actual location or condition of a remote object, wherein said estimate includes an estimated position and standard deviation. As such, sensory detection and measurement of object locations and conditions are typically referred to as 'estimates.' The characteristics of the object-locating sensors 66 may be complementary in that some may be more reliable in estimating certain parameters than others. The object-locating sensors 66 may have different operating ranges and angular coverages capable of estimating different parameters within their operating ranges. For example, radar sensors may estimate range, range rate and azimuth location of a remote object, but are not normally robust in estimating the extent of a remote object. A camera with vision processor is more robust in estimating a shape and azimuth position of a remote object, but may be less efficient at estimating the range and range rate of an object. Scanning type LIDAR sensors perform efficiently and accurately with respect to estimating range, and azimuth position, but typically cannot estimate range rate, and therefore may not be as accurate with respect to new object acquisition/recognition. Ultrasonic sensors are capable of estimating range but may be less capable of estimating or computing range rate and azimuth position. The performance of each of the aforementioned sensor technologies is affected by differing environmental conditions. Thus, some of the object-locating sensors 66 may present parametric variations during operation, although overlapping coverage areas of the sensors create opportunities for sensor data fusion. Sensor data fusion includes combining sensory data or data derived from sensory data from various sources that are observing a common field of view such that the resulting information is more accurate and precise than would be possible when these sources are used individually.

The HMI system 75 provides for human/machine interaction, for purposes of directing operation of an infotainment system, accessing and controlling the on-board navigation system 55, communicating with a remotely located service center, etc. The HMI system 75 monitors operator requests and provides information to the operator including status of vehicle systems, service and maintenance information. The HMI system 75 communicates with and/or controls operation of a plurality of in-vehicle operator interface device(s). The HMI system 75 may also communicate with one or more devices that monitor biometric data associated with the vehicle operator, including, e.g., eye gaze location, posture, and head position tracking, among others. The HMI system 75 is depicted as a unitary device for ease of description, but may be configured as a plurality of controllers and associated sensing devices in an embodiment of the system described herein. The in-vehicle operator interface device(s) can include devices that are capable of transmitting a message urging operator action, and can include an electronic visual display module, e.g., a liquid crystal display (LCD) device, a heads-up display (HUD), an audio feedback device, a wearable device, and a haptic device such as a haptic seat.

The vehicle 10 can include an autonomous operating system 45 that is disposed to provide a level of autonomous vehicle operation. The autonomous operating system 45 includes a controller and one or a plurality of subsystems that may include an autonomous steering system 46, the ACC system 40, an autonomous braking/collision avoidance system, the lane-keeping system, a lane-centering system, and/or other systems that are configured to command and control autonomous vehicle operation separate from or in conjunction with the operator requests. The autonomous operating system 45 may interact with and access information from the map database 56 for route planning and to control operation of the vehicle via the lane-keeping system, the lane-centering system, and/or other systems that are configured to command and control autonomous vehicle operation. Autonomous operating commands may be generated to control the autonomous steering system 46, the ACC system 40, the autonomous braking/collision avoidance system and/or the other systems. Vehicle operation includes operation in one of the propulsion modes in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel 110, a transmission range selector, the ACC system 40, and a turn signal lever. The steering wheel 110 includes an operator notification element 108, which may include a controllable light bar that is disposed on an upper portion thereof, and/or one or a plurality of haptic devices that are disposed near hand grip portions thereof. The operator notification element 108 is an element of the HMI system 75, and is thereby controlled.

Vehicle acceleration includes a tip-in event, which is a request to increase vehicle speed, i.e., accelerate the vehicle. A tip-in event can originate as an operator request for acceleration or as an autonomous vehicle request for acceleration. One non-limiting example of an autonomous vehicle request for acceleration can occur when a sensor for the ACC system 40 indicates that a vehicle can achieve a desired vehicle speed because an obstruction has been removed from a lane of travel, such as may occur when a slow-moving vehicle exits from a limited access highway. Braking includes an operator request to decrease vehicle speed. Steady-state running includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag, or drag torque. Coasting includes vehicle operation wherein vehicle speed is above a minimum threshold speed and the operator request to the accelerator pedal is at a point that is less than required to maintain the present vehicle speed. Idle includes vehicle operation wherein vehicle speed is at or near zero. The autonomous operating system 45 includes an instruction set that is executable to determine a trajectory for the vehicle 10, and determine present and/or impending road conditions and traffic conditions based upon the trajectory for the vehicle 10.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
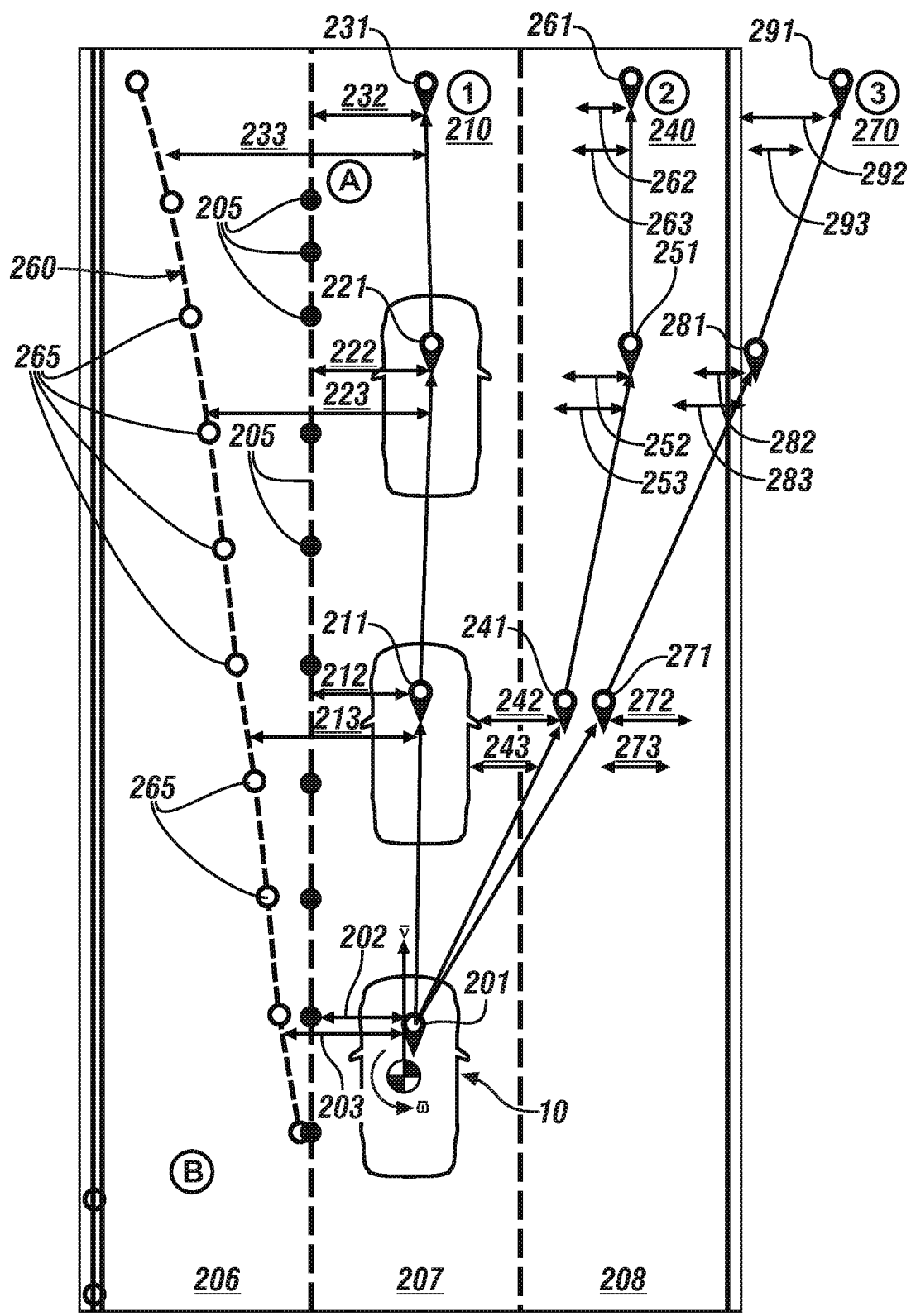
FIG. 2 schematically shows a plan view of a vehicle operating on a road system, in accordance with the disclosure.

FIG. 2 schematically shows a plan view of an embodiment of the vehicle 10 described with reference to FIG. 1, wherein the vehicle 10 is disposed on a portion of a roadway system 200. As described herein, the vehicle 10 includes the autonomous operating system 45, map database 56, GPS sensor 50, and one or a plurality of object-locating sensors 66 that are capable of forward-monitoring, and is capable of autonomous operation. The roadway system 200 as illustrated includes a multi-lane road system composed of a left lane 206, a center lane 207, and a right lane 208, and a plurality of lane reference markers 205. The plurality of lane reference markers 205 demarcate and define ground truth for the portion of the roadway system 200 that is shown. The plurality of lane reference markers 205 may be in the form of painted lines on a surface of the roadway system 200, light-reflective transducers or other devices disposed on the roadside, or other devices. As employed herein, the term "ground truth" is employed to describe the geographical location of a road surface as it exists at the point in time at which it is being traversed by the vehicle 10, e.g., one of the aforementioned lanes 206, 207, 208 of the roadway system 200.

A map-based trajectory line 260 as defined by the map database 56 for the portion of the roadway system 200 is indicated by a plurality of map-based trajectory points 265. Each of the map-based trajectory points 265 includes a GPS position, and may also include expected road parameters at the associated GPS position, such as lateral curvature, crown, longitudinal slope, etc. The map-based trajectory line 260 may deviate from the ground truth defined by the lane reference markers 205 due to short-term, temporary changes such as rerouting due to a construction zone, and/or due to permanent changes as a result of road reconstruction. As shown, the map-based trajectory line 260 deviates from the ground truth defined by the lane reference markers 205 by veering leftward.

Operation of the vehicle 10 is parameterized by a first lateral offset, which is associated with the ground truth for the portion of the roadway system 200. The first lateral offset is defined and determined based upon a lateral difference between the vehicle 10 and one of the lane reference markers 205 that has been detected by the object-locating sensors 66 that are capable of forward-monitoring. Operation of the vehicle 10 is also parameterized by a second lateral offset, which is associated with the map database 56 associated with the autonomous operating system 45. The second lateral offset is defined and determined based upon a lateral difference between the vehicle position defined by the GPS sensor 50 and the GPS position associated with the map-based trajectory point 265.

Scenarios are depicted that are associated with operation of the vehicle 10 on the roadway system 200. A first scenario 210 is associated with operation of the vehicle 10 while travelling in the center travel lane 207, and includes operation at an initial point 201, and at three successive points, including a first point 211, a second point 221, and a third point 231. A first lateral offset is determined based upon a lateral difference between the vehicle 10 and one of the lane reference markers 205 that has been detected by the object-locating sensors 66 that are capable of forward-monitoring. The first lateral offset includes a first lateral offset 202 for the initial point 201, a first lateral offset 212 associated with the successive first point 211, a first lateral offset 222 associated with second point 221, and a first lateral offset 232 associated with third point 231. A second lateral offset is determined based upon a lateral difference between the vehicle position defined by the GPS sensor 50 and the GPS position associated with the respective map-based trajectory point 265. The second lateral offset includes a second lateral offset 203 for the initial point 201, a second lateral offset 213 associated with the successive first point 211, a second lateral offset 223 associated with second point 221, and a second lateral offset 232 associated with third point 231. Under the first scenario 210, the successive values for the first lateral offset 212, 222 and 232 remain substantially unchanged, whereas the successive values for the second lateral offset 213, 223, and 233 would be seen to increase due to the veering off of the map-based trajectory points 265.

A second scenario 240 is associated with operation of the vehicle 10, which includes initially travelling in the center travel lane 207, and executing a lane change maneuver into the right lane 208, including the initial point 201 and three successive points, including a first point 241, a second point 251, and a third point 261. Successive values for the first lateral offset 202, 242, 252 and 262 are determined based upon a lateral difference between the vehicle 10 and one of the lane reference markers 205 that has been detected by the object-locating sensors 66 that are capable of forward-monitoring. Successive values for the second lateral offset 203, 243, 253, and 263 are determined based upon a lateral difference between the vehicle position defined by the GPS sensor 50 and the GPS position associated with the respective map-based trajectory point 265. Under the second scenario 240, the successive values for the first lateral offset 202, 242, 252 and 262 indicate an increase, with a rollover that indicates the lane change, and reaching a second point that substantially unchanged, whereas the successive values for the second lateral offset 203, 243, 253, and 263 would be seen to increase due to the veering off of the map-based trajectory points 265 coupled with the lane change maneuver.

A third scenario 270 is associated with operation of the vehicle 10, with includes initially travelling in the center travel lane 207, and executing a lane change maneuver into the right lane 208, with continued veering that may be indicative of an exit maneuver, including the initial point 201 and three successive points, including a first point 271, a second point 281, and a third point 291. Successive values for the first lateral offset 202, 272, 282 and 292 are determined based upon a lateral difference between the vehicle 10 and one of the lane reference markers 205 that has been detected by the object-locating sensors 66 that are capable of forward-monitoring. Successive values for the second lateral offset 203, 273, 283, and 293 are determined based upon a lateral difference between the vehicle position defined by the GPS sensor 50 and the GPS position associated with the respective map-based trajectory point 295. Under the third scenario 270, the successive values for the first lateral offset 202, 272, 282 and 292 indicate an increase, with a rollover that indicates the lane change, and continued increase that is indicative of a rightward exit, whereas the successive values for the second lateral offset 203, 273, 283, and 293 would be seen to increase due to the veering off of the map-based trajectory points 295 coupled with the lane change maneuver.

The first, second, and third scenarios 210, 240 and 270 contemplate situations in which there may be a benefit to having a second method for monitoring the ground truth of the roadway.

Figure 3:
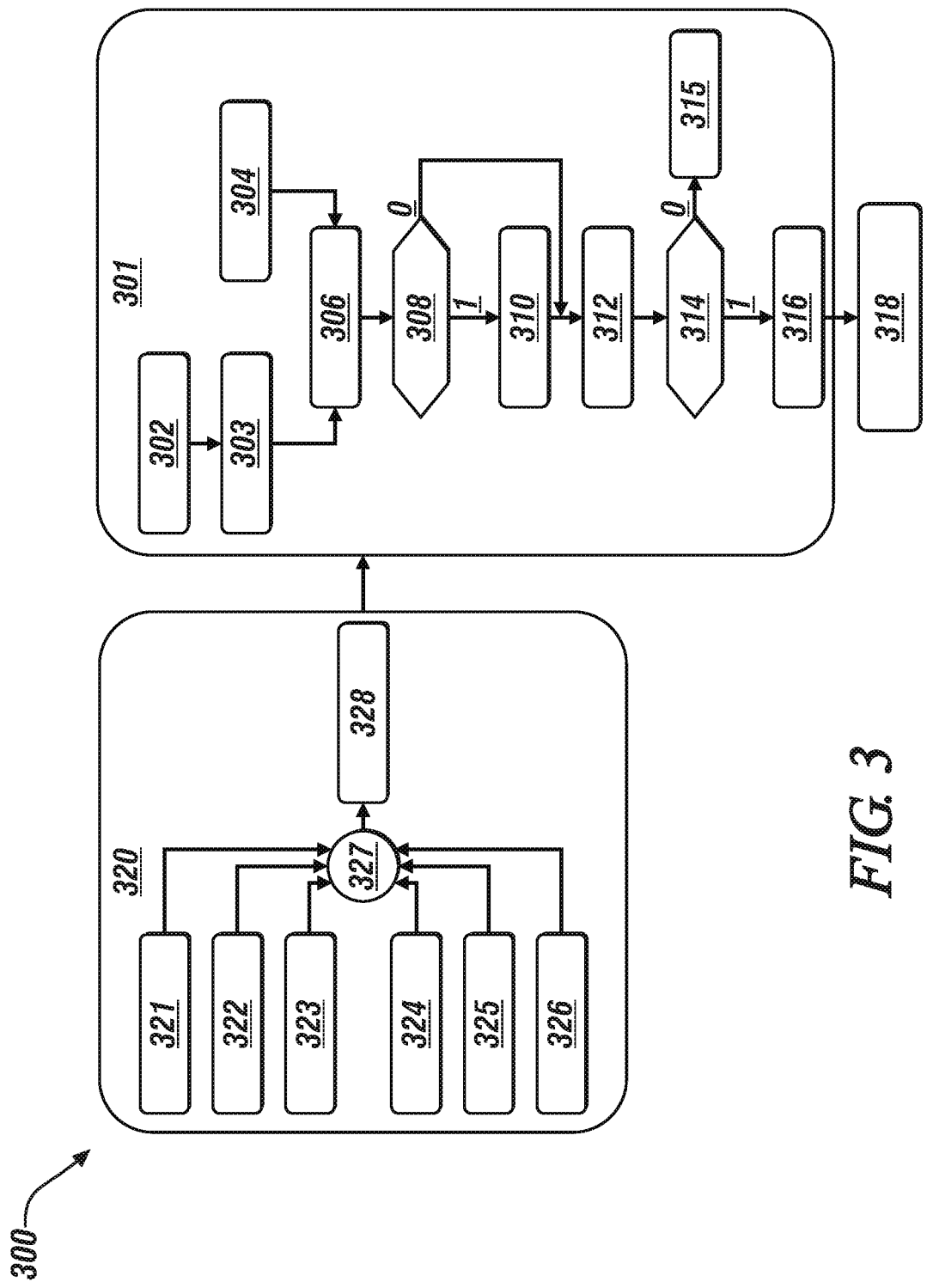
FIG. 3 schematically shows a ground truth monitoring routine that may be employed to operate an autonomously controllable vehicle in a travel lane of a road system, in accordance with the disclosure.

FIG. 3 schematically shows a ground truth monitoring routine 300 that may be employed to control an embodiment of the vehicle 10 that is described with reference to FIG. 1, and operation of the vehicle 10 in one of the travel lanes of the roadway system 200 that is described with reference to FIG. 2. Overall, the ground truth monitoring routine 300 includes operating the vehicle 10 in one of the travel lanes of the roadway system 200 employing various elements of the autonomous operating system 45, including the lane keeping control system and the ACC system 40 and monitoring, via the object-locating sensor(s) 66 capable of forward-monitoring, a plurality of lane reference markers 205 associated with the respective travel lane 207. The ground truth monitoring routine 300 includes periodically determining a first lateral offset for the vehicle 10 based upon the GPS sensor 50 and the map database 56, determining a second lateral offset for the vehicle 10 based upon the forward-monitoring sensor and one of the lane reference markers, and determining a difference between the first lateral offset and the second lateral offset. A variance in the periodically determined differences between the first lateral offset and the second lateral offset is determined, and an error in the map database is detected when the variance is greater than a threshold variance. The vehicle operator may be alerted to actively control the vehicle 10 based upon the detected error in the map database under certain conditions.

Table 1 is provided as a key wherein the numerically labeled blocks and the corresponding functions are set forth as follows, corresponding to an embodiment of the ground truth monitoring routine 300. The teachings may be described herein in terms of functional and/or logical block components and/or various processing steps that may be executed in controller 15. The block components may be composed of hardware, software, and/or firmware components that have been configured to perform the specified functions.

TABLE 1

| BLOCK | BLOCK CONTENTS |
|---|---|
| 301 | Map error correction monitoring |
| 302 | Determine first lateral offset |
| 303 | Filter first lateral offset |
| 304 | Determine second lateral offset |
| 306 | Determine lateral offset differential |
| 308 | Is change in lateral offset differential greater than threshold? |
| 310 | Compensate lateral offset differential for lane change, etc. |
| 312 | Determine variance in lateral offset differential |
| 314 | Is variance > threshold? |
| 315 | End iteration |
| 316 | Set map error flag |
| 318 | Mitigate risk |
| 320 | Enable criteria |
| 321 | Determine front camera sensing confidence |
| 322 | Determine front camera lateral offset stable |
| 323 | Determine GPS position confidence |
| 324 | Determine GPS is steady in real time correction |
| 325 | Determine GPS 2D position error |
| 326 | Is localization map matching state? |
| 327 | Are all enable criteria met? |
| 328 | Enable map error detection |

The steps of the ground truth monitoring routine 300 may be executed in a suitable order, and are not limited to the order described with reference to FIG. 3. As employed herein, the term "1" indicates an answer in the affirmative, or "YES", and the term "0" indicates an answer in the negative, or "NO".

The ground truth monitoring routine 300 captures data associated with the second lateral offset and the first lateral offset only when a plurality of enable criteria are achieved (320). The enable criteria include determining a confidence level associated with monitoring capability of at least one of the object-locating sensors 66, including confidence in a capability to detect and sense a lateral offset of the vehicle 10 in relation to a lane reference marker 205 associated with the travel lane (321). The enable criteria include assessing whether the lateral offset of the vehicle 10 in relation to the lane reference marker 205 associated with the travel lane is and has been stable for a period of time immediately preceding the present time (322). This may include, or be indicative of, an assessment that no lane change has been detected or occurred. The enable criteria include determining a confidence level with regard to accuracy of data from the GPS sensor 50 (323). This may include comparing the data from the GPS sensor 50 with GPS data from a cellular phone that is linked to the on-board telematics device 60. The enable criteria include assessing real-time stability of the signal from the GPS sensor 50 (324). The enable criteria include estimating a two-dimensional (2D) position error associated with the signal from the GPS sensor 50, and determining that it is less than a threshold error (325). The enable criteria include determining whether the signal from the GPS sensor 50 matches the information from the map database 56 of the autonomous operating system 45 with regard to the map-based trajectory line 260 (326). The foregoing list of enable criteria is exemplary, and other enable criteria may be employed under certain conditions. By way of non-limiting examples, other enable criteria may include absence of faults related to on-vehicle operating systems, absence of communication faults, etc.

When the aforementioned enable criteria are satisfied, i.e., steps 321-326 (327), operation of the map error correction monitoring (301) portion of the ground truth monitoring routine 300 may be executed (328). This includes capturing, in a FIFO buffer of the controller 15, the periodically determined difference between the second lateral offset and the first lateral offset, but only when the plurality of enable criteria associated with the respective difference between the second lateral offset and the first lateral offset are satisfied. In a similar manner, the periodically determined difference between the second lateral offset and the first lateral offset are excluded from the FIFO buffer of the controller 15 when any one or more of the plurality of enable criteria associated with the respective difference between the second lateral offset and the first lateral offset are not satisfied.

The map error correction monitoring portion (301) includes determining a raw value for the first lateral offset (302), and subjecting the result to filtering for noise removal (303). As previously described, the first lateral offset is associated with the ground truth for the portion of the roadway system that is presently being traversed by the vehicle 10. The first lateral offset is determined based upon a lateral difference between the vehicle 10 and one of the lane reference markers 205 that has been detected by the object-locating sensors 66 that are capable of forward-monitoring.

Coincidently, the second lateral offset is determined (304). The second lateral offset 267 is determined based upon the lateral difference between the vehicle position defined by the GPS sensor 257 and the GPS position associated with map-based trajectory point 265.

A lateral offset differential is determined based upon a difference between the first lateral offset and the coincidently determined second lateral offset (306). A change in the lateral offset differential from a previous iteration is determined, and is evaluated in comparison to a threshold (308). This step is executed to determine whether a lane change event has or is occurring, and to determine if there is a shift in the map-based trajectory line 260. If not greater than the threshold differential (308)(0), the routine skips step 310 and advances to step 312.

If greater than the threshold differential (308)(1), the lateral offset differential may be compensated for in the event that a lane change event has occurred (310).

A variance in the lateral offset differential is determined (312). Determining the variance in the lateral offset differential includes capturing the results from successive iterations of determining the lateral offset differential in a FIFO (first in-first out) data buffer, and executing a variance calculation to determine the variance Var(x) in accordance with the following equation:

$$\text{Var}(x) = \Sigma_{i=0}^{N} p_i \cdot (x_i - \mu)^2$$

N: Observation Window Size Cal wherein:

$p_i$ is a weighting factor, and is equal to 1/N in one embodiment, $x_i$ represents individual lateral offset differential values, and $\mu$ is a mean of the lateral offset differential values in the data buffer.

In one embodiment, the buffer size, i.e., the observation window size is N=100.

The variance in the lateral offset differential is compared to a threshold variance (314), and if less than the threshold variance (314)(0), this iteration ends without further action (315).

When the lateral offset differential is greater than the threshold variance (314)(1), an error flag associated with the map database is set to TRUE (316), which initiates actions to mitigate risks (318). Mitigating risks (318) includes capturing and recording GPS location at which the error flag has been set. Mitigating risks (318) also includes alerting the vehicle operator to actively control the vehicle 10 based upon the detected error in the map database under certain conditions. The HMI system 75 may be employed to alert the vehicle operator, including employing the operator notification element 108 of the steering wheel 110, including illuminating or changing color of the controllable light bar that is disposed on an upper portion thereof, and/or vibrating one or a plurality of the haptic devices that are disposed near hand grip portions thereof. The operator notification element 108 is an element of the HMI system 75, and is thereby controlled.

Vehicle operation that includes employing an embodiment of the ground truth monitoring routine 300 facilitates detecting a map error and sending signals to alert a vehicle operator prior to a point at which a lane excursion occurs, to permit mitigation by the vehicle operator.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including one or a plurality of executable instruction sets that implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a vehicle, wherein the vehicle includes an on-board map database, a global positioning system (GPS) sensor, and an autonomous operating system including a forward-monitoring sensor, an adaptive cruise control system, and a lane keeping control system, the method comprising:
 operating the vehicle in a travel lane employing the lane keeping control system and the adaptive cruise control system;
 monitoring, via the forward-monitoring sensor, a plurality of lane reference markers associated with the travel lane;
 periodically:
  determining a first lateral offset for the vehicle based upon the forward-monitoring sensor and one of the lane reference markers,
  determining a second lateral offset for the vehicle based upon data from the GPS sensor and the map database, and
  determining a difference between the second lateral offset and the first lateral offset;
 determining a lateral offset differential based upon the periodically determined first lateral offsets;
 detecting occurrence of a lane change maneuver based upon the lateral offset differential;
 compensating for the difference between the second lateral offset and the first lateral offset based upon the occurrence of the lane change maneuver;
 determining, via a controller, a variance in the periodically determined differences between the second lateral offset and the first lateral offset;
 detecting an error in the map database when the variance is greater than a threshold variance; and
 alerting a vehicle operator to actively control the vehicle based upon the error in the map database.

2. The method of claim 1, comprising determining the second lateral offset for the vehicle coincident in time and in space with determining the first lateral offset for the vehicle.

3. The method of claim 1, wherein determining the variance in the periodically determined differences between the second lateral offset and the first lateral offset comprises:
 capturing, in a buffer of the controller, each of the periodically determined differences between the second lateral offset and the first lateral offset; and
 determining the variance of the periodically determined differences between the second lateral offset and the first lateral offset that are captured in the buffer of the controller.

4. The method of claim 3, wherein the buffer of the controller comprises a first-in, first-out (FIFO) buffer.

5. The method of claim 4, further comprising
 monitoring a plurality of enable criteria associated with each of the periodically determined differences between the second lateral offset and the first lateral offset; and
 excluding the periodically determined difference between the second lateral offset and the first lateral offset when any one of the plurality of enable criteria associated with a difference between the second lateral offset and the first lateral offset are not satisfied.

6. The method of claim 4, further comprising:
 monitoring a plurality of enable criteria associated with each of the periodically determined differences between the second lateral offset and the first lateral offset; and
 capturing, in the buffer of the controller, the periodically determined difference between the second lateral offset and the first lateral offset only when the plurality of enable criteria associated with a difference between the second lateral offset and the first lateral offset are satisfied.

7. The method of claim 6, wherein monitoring the plurality of enable criteria associated with each of the periodically determined differences between the second lateral offset and the first lateral offset comprises determining a confidence level associated with monitoring capability of the forward-monitoring sensor.

8. The method of claim 6, wherein monitoring the plurality of enable criteria associated with each of the periodically determined differences between the second lateral offset and the first lateral offset comprises assessing whether the lateral offset of the vehicle in relation to the lane marker has been stable for a period of time immediately preceding a present time.

9. The method of claim 6, wherein monitoring the plurality of enable criteria associated with each of the periodically determined differences between the second lateral offset and the first lateral offset comprises determining a confidence level associated with accuracy of the data from the GPS sensor.

10. The method of claim 6, wherein monitoring the plurality of enable criteria associated with each of the periodically determined differences between the second lateral offset and the first lateral offset comprises determining a two-dimensional (2D) position error associated with the data from the GPS sensor.

11. The method of claim 6, wherein monitoring the plurality of enable criteria associated with each of the periodically determined differences between the second lateral offset and the first lateral offset comprises determining whether the signal from the GPS sensor matches information from the map database of the autonomous operating system.

12. A vehicle, comprising:
 an autonomous operating system including a forward-monitoring sensor, an adaptive cruise control system, and a lane keeping control system;
 an on-board map database;
 a global positioning system (GPS) sensor;
 a controller, in communication with the autonomous operating system and the GPS sensor, the controller including a storage medium including an instruction set, the instruction set executable to:
 operate the vehicle in a travel lane employing the lane keeping control system and the adaptive cruise control system;
 monitor, via the forward-monitoring sensor, a plurality of lane reference markers associated with the travel lane;
 periodically:
  determine a first lateral offset for the vehicle based upon the forward-monitoring sensor and one of the lane reference markers,
  determine a second lateral offset for the vehicle based upon the GPS sensor and the map database, and
  determine a difference between the second lateral offset and the first lateral offset;
 determine a lateral offset differential based upon the periodically determined first lateral offsets:
 detect occurrence of a lane change maneuver based upon the lateral offset differential;
 compensate for the difference between the second lateral offset and the first lateral offset based upon the occurrence of the lane change maneuver;
 determine a variance in the periodically determined differences between the second lateral offset and the first lateral offset;

detect an error in the map database when the variance is greater than a threshold variance;

and alert the vehicle operator to actively control the vehicle based upon the detected error in the map database.

13. The vehicle of claim 12, wherein the instruction set is executable to determine the second lateral offset for the vehicle coincident with determining the first lateral offset for the vehicle.

14. The vehicle of claim 12, wherein the instruction set being executable to determine the variance in the periodically determined differences between the second lateral offset and the first lateral offset comprises the instruction set being executable to:

capture, in a buffer of the controller, each of the periodically determined differences between the second lateral offset and the first lateral offset; and determine the variance of the periodically determined differences between the second lateral offset and the first lateral offset that are captured in the buffer of the controller.

15. The vehicle of claim 14, wherein the buffer of the controller comprises a first-in, first-out (FIFO) buffer.

16. The vehicle of claim 14, wherein the instruction set is further executable to:

monitor a plurality of enable criteria associated with each of the periodically determined differences between the second lateral offset and the first lateral offset; and exclude the periodically determined difference between the second lateral offset and the first lateral offset when any one of the plurality of enable criteria associated with the difference between the second lateral offset and the first lateral offset are not satisfied.

17. The vehicle of claim 14, wherein the instruction set is further executable to:

monitor a plurality of enable criteria associated with each of the periodically determined differences between the second lateral offset and the first lateral offset; and capture, in the buffer of the controller, the periodically determined difference between the second lateral offset and the first lateral offset only when the plurality of enable criteria associated with the difference between the second lateral offset and the first lateral offset are satisfied.

* * * * *